United States Patent
Görtler et al.

(10) Patent No.: US 7,673,513 B2
(45) Date of Patent: Mar. 9, 2010

(54) NON-CONTACT SHOCK SENSOR

(75) Inventors: Sebastian Görtler, Erlangen (DE); Robert Kagermeier, Nürnberg (DE); Rainer Kuth, Höchstadt (DE); Klaus Ludwig, Nürnberg (DE); Gerhard Weller, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 129 days.

(21) Appl. No.: 11/899,553

(22) Filed: Sep. 6, 2007

(65) Prior Publication Data
US 2008/0307884 A1 Dec. 18, 2008

(30) Foreign Application Priority Data
Sep. 8, 2006 (DE) .................... 10 2006 042 382

(51) Int. Cl.
*G01P 15/00* (2006.01)
*G01P 15/10* (2006.01)
(52) U.S. Cl. .................. 73/514.01; 73/514.16
(58) Field of Classification Search .............. 73/514.01, 73/514.16, 514.29, 510, 511
See application file for complete search history.

(56) References Cited
U.S. PATENT DOCUMENTS

| | | | |
|---|---|---|---|
| 4,398,417 A | 8/1983 | Shutt | |
| 4,831,879 A | 5/1989 | Condne et al. | |
| 6,720,866 B1 | 4/2004 | Sorrells et al. | |
| 7,061,380 B1* | 6/2006 | Orlando et al. | 340/572.1 |
| 7,148,803 B2* | 12/2006 | Bandy et al. | 340/539.16 |
| 7,187,961 B2* | 3/2007 | Yamashita et al. | 600/310 |
| 7,397,370 B2* | 7/2008 | Bratkovski | 340/539.26 |
| 2002/0067265 A1* | 6/2002 | Rudolph | 340/572.1 |
| 2005/0242950 A1* | 11/2005 | Lindsay et al. | 340/539.26 |

FOREIGN PATENT DOCUMENTS

| | | |
|---|---|---|
| DE | 242289 | 1/1987 |
| DE | 10012204 | 9/2001 |
| DE | 60021971 | 5/2006 |
| EP | 1607723 | 12/2005 |

* cited by examiner

Primary Examiner—Helen C. Kwok

(57) ABSTRACT

The invention relates to a sensor device for monitoring accelerations to which an object is subjected. In order to detect whether a value has exceeded or is below a threshold for the acceleration to which objects have been subjected in the past, i.e. without having visual contact with the sensor, the inventive sensor device includes an acceleration sensor, which is permanently linked to the object to be monitored, so that a relative movement between the acceleration sensor and the object is prevented, and an RFID transceiver for non-contact coupling of electrical energy into the acceleration sensor and for sending out radio signals as a function of the physical state of the acceleration sensor.

16 Claims, 2 Drawing Sheets

NON-CONTACT SHOCK SENSOR

CROSS REFERENCE TO RELATED APPLICATIONS

This application claims priority of German application No. 10 2006 042 382.8 filed Sep. 8, 2006, which is incorporated by reference herein in its entirety.

FIELD OF THE INVENTION

The invention relates to the monitoring of physical parameters of objects during their transport and especially to a sensor device for accelerations, i.e. shocks to which transported items are subjected, in accordance with the claims.

BACKGROUND OF THE INVENTION

When goods are dispatched and transported it can be necessary, if these goods are fragile, for them to be protected from shocks. They must therefore be given a special protection during transport and it is important to be able to check at the destination or at particular times whether they have been subjected to too high an acceleration since the beginning of the transport process. Thus freight forwarders must be in a position to check the status of the goods when handing them over or to be able to document this status so that a seamless monitoring of transport is ensured. For this reason it should be possible to check the state of the objects at as many points in the logistics chain as possible without any great effort.

In the prior art simple visual indicators are used for this purpose which remain on the transport object and on which balls visible from outside lie within an indentation. During a sharp acceleration these balls roll out of the indentations and thus document the shock to which the transport objects have been subjected. Alternately glass bodies are used which are attached to the goods for transport. These are irreversibly destroyed if a correspondingly heavy impact has occurred.

The disadvantage of the devices according to the prior art however is that they make a visual check necessary, which causes difficulties especially with goods for transport which are transported within more comprehensive packaging or in a container.

SUMMARY OF THE INVENTION

The object of the present invention is to create a device with which the exceeding of a threshold value for the acceleration to which the objects have been subjected in the past can be detected without this having to be done visually.

This object is achieved by a device as claimed in the claims. Preferred embodiments of the invention are the subject matter of the subclaims.

The invention is based on inventive idea of connecting an RFID (Radio Frequency Identification) chip to an acceleration sensor. The acceleration sensor is equipped with a conductor loop and a moveable mass, with the conductor loop being destroyed by the movement of the mass on impact. The change in resistance triggered by this can be read out via the RFID chip as a change to a memory bit. An elastic suspension (e.g. a spring) is preferably used for horizontal impacts.

The inventive design enables the sensor to be read out in a simple, i.e. non-contact, wear-free manner, i.e. any number of times and independent of a line of sight, e.g. from within a container.

The inventive sensor device for monitoring accelerations to which an object is subjected is characterized by an acceleration sensor which is permanently linked to the object to be monitored so that a relative movement between the acceleration sensor and the object is prevented, and an RFID transceiver device for non-contact coupling of electrical energy into the acceleration sensor and for emitting radio signals depending on the physical state of the acceleration sensor.

In particular the acceleration sensor includes a moveable mass which, depending on the acceleration, undergoes a deflection from a rest position, a support frame for holding the moveable mass and at least one electrical conductor which is connected to the RFID transceiver device, with the or at least one of the electrical conductors being irreversibly interrupted if the deflection of the moveable mass exceeds a predeterminable threshold value. The irreversible interruption of the electrical conductors gives reliable information about the threshold value which has been exceeded by the acceleration.

In this case the moveable mass is preferably held over the at least one electrical conductor by a support frame and the or the at least one electrical conductor fractures if the deflection of the moveable mass exceeds a predetermined threshold value. The invention can be implemented especially simply and at especially low cost with this design.

Alternatively the support frame includes at least one sensor wall to which the or the at least one of the electrical connectors is permanently connected, with the moveable mass being pressed against the sensor wall depending on the acceleration so that this wall is deformed by the pressure and the electrical conductor is irreversibly interrupted if the pressure on the sensor wall exceeds a predetermined threshold value. This design allows the moveable mass in the support frame to be protected against damage by a wall.

The sensor wall in this case especially includes a glass disc which fractures when deformed. Alternately the sensor wall can include a flexible membrane. In the latter case no fragments remain to be distributed in an uncontrolled manner into the environment if the sensor wall fractures.

In both cases the electrical conductor is preferably embedded into the sensor wall. This prevents it being unintentionally destroyed by damage to the surface of sensor wall without this being attributable to too high an acceleration.

In a further preferred embodiment the moveable mass features a narrow edge with which it presses against the sensor wall. In this way the contact surface is reduced and the effective pressure on the sensor wall is increased to the same degree so that it is subjected to a greater load and thus breaks more quickly.

In particular the mass is moveable in a number of directions and the support frame features a number of sensor walls which are arranged in different directions. This allows the acceleration to be discriminated according to direction as well as according to strength. This is of importance if the monitored object is sensitive to impact from a particular direction and may possibly be packed unsymmetrically.

Preferably a number of the electrical conductors are each connected in series with a predetermined bias resistor to a direction detector, with the bias resistors each having different values and a number of direction detectors being connected in parallel to record the direction(s) of the acceleration. This is necessary if one wishes to discriminate the direction from which the impact came without having to visually investigate the sensor.

Preferably a transport locking device is provided with which the moveable mass can be secured. This enables the inventive sensor device to be switched from a deactivated state into an activated state and vice-versa.

As well as the advantages already mentioned, a further advantage of the invention is that no power supply and no electronic memory is necessary for detecting the exceeding of a threshold value for the acceleration.

BRIEF DESCRIPTION OF THE DRAWINGS

Further features and advantages of the invention emerge from the following description of exemplary embodiments which refer to the enclosed drawing.

DETAILED DESCRIPTION OF THE INVENTION

Figure 1:
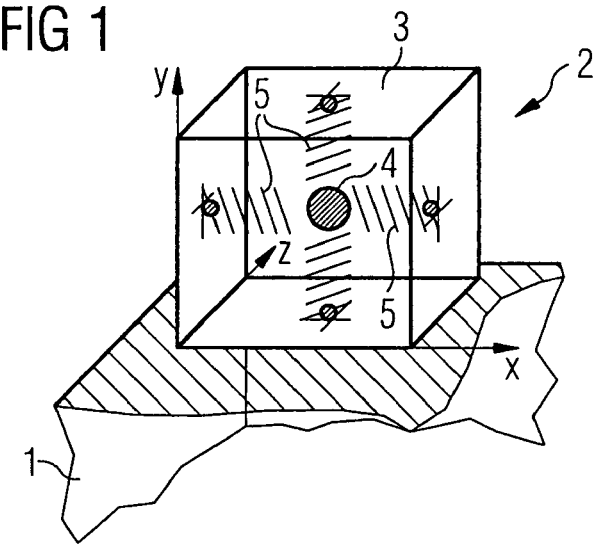
FIG. 1 shows a schematic diagram of the basic structure of the first embodiment of the inventive acceleration sensor.

The drawing is not true-to-scale. The same elements or elements with the same effect are provided with the same reference numbers.

The principal of the invention is depicted schematically in FIG. 1. An acceleration sensor 2 is permanently attached to an object 1 for which it is also to be established retrospectively, as regards acceleration, whether a limit value has been exceeded or not. The term "permanently attached" in the context explained here means that there is no movement or only negligible relative movement between the object 1 and the acceleration sensor 2. In other words the acceleration which operates on the object operates with equal strength on the acceleration sensor 2 as well. The acceleration sensor 2 is made up of a support frame 3 and a movable mass 4 supported within this frame. The support frame 3 takes the form of a cube here although it is obvious to the person skilled in the art that it can have almost any form and be selected depending on the use of the acceleration sensor and depending on the space available for the acceleration sensor. In particular the support frame can be in the form of a sphere (not shown) and can consist of a single sensor wall.

The mass 4 is spherical in the illustration shown in FIG. 1 and is suspended from a number of springs 5. These springs 5 run horizontally in parallel to the plane of the drawing, i.e. in the direction designated by "x" or vertically in parallel to the plane of the drawing, i.e. in the direction designated by "y". Naturally the mass 4 must also be suspended in the "z" direction for complete three-dimensional freedom of movement. These springs are omitted from the drawing for reasons of clarity. Obviously the coil springs in the drawing are only meant symbolically and are intended generally to indicate an existing force of which the size generally and without any restrictions (e.g. linear or quadratic, with negative leading sign, etc.) depends on the deflection path and which forces the mass back into its rest position.

Figure 2:
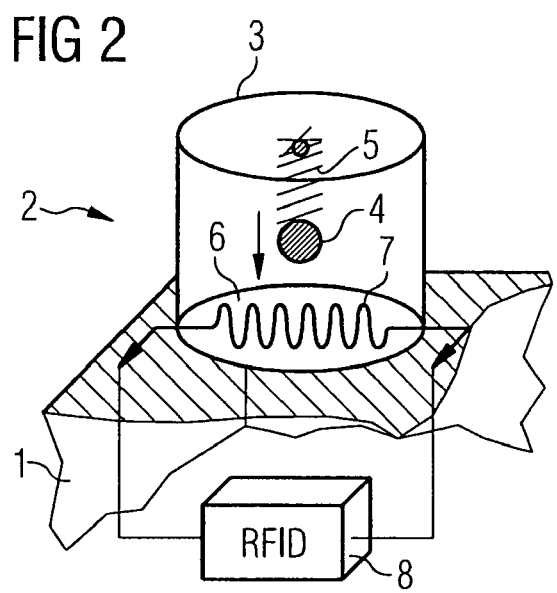
FIG. 2 shows a schematic diagram of a second embodiment of the inventive acceleration sensor.

FIG. 2 shows a further embodiment of an acceleration sensor, with reference to which the operation of the sensor will be explained below. The support frame 3 of the sensor is tubular in this embodiment with a cylindrical side wall, a wall enclosing the support frame 3 at the top and a wall enclosing the support frame 3 at the bottom. The wall enclosing the support frame 3 at the bottom simultaneously serves as a sensor wall 6 which is explained in greater detail below. The moveable mass 4 is suspended in this embodiment via a spring 5 on the upper wall and swings freely in the vertical, i.e. in the z direction. The movement of the mass 4 is indicated in FIG. 2 by an arrow pointing downwards next to the mass 4. If the acceleration is too great, i.e. if the mass 4 is deflected too far downwards in relation to its rest position, the mass 4 touches the sensor wall 6. The sensor wall 6 is shown for reasons of clarity in FIG. 2 as coplanar with a wall of the object 1. In practice however there will be a (small) gap between the breakable sensor wall 6 and the object 1.

If the acceleration is greater than a predetermined threshold value the moveable mass 4 collides correspondingly heavily with the sensor wall 6 and definitively destroys the latter. This also interrupts an electrical conductor 7 which is located on or below the sensor wall 6 and is glued in this position for example. The conductor 7 can however equally well be embedded in the sensor wall 6. The conductor 7 preferably extends in this case (meandering or in the form of a spiral) over the largest possible part of the surface 6 so that it is also interrupted by a partial damaging of the sensor wall 6 by the mass 4, if for example the moveable mass 6 meets the sensor wall 6 at an angle and only destroys an edge area of this wall.

The sensor wall 6 is preferably a glass disk the thickness of which is tailored to the acceleration as from which it is to be destroyed by the moveable mass 4. The moveable mass 4 is preferably a steel ball of a suitable diameter or consists of another metal which has as high a density as possible and a low elasticity/high hardness. In this way even in a small space for the sensor device a high pressure is exerted on the sensor wall 6 with a sharper acceleration and the impact of the mass 4. Further possible embodiments for this are discussed below.

The electrical conductor 7 is routed out on both sides from the support frame 3 and is connected to a radio transmission module 8. It thus forms a conductor bridge of which the status is interrogated. The radio transmission module 8 is preferably what is known as an RFID module with devices for non-contact coupling of electrical energy into the conductor bridge 7 and for transmission of (high frequency) radio signals. The signals are modulated by a microcontroller (not shown) and if necessary a ROM as a function of the physical state of the acceleration sensor, so that in this way the state of the conductor bridge 7 of the acceleration sensor can be interrogated. RFID modules are now standardized and widely used so that they are very reliable in use or can be replaced without difficulty. In addition RFID modules allow the cost of manufacturing the inventive sensor device as well as the associated communication devices to be minimized.

Figure 3:
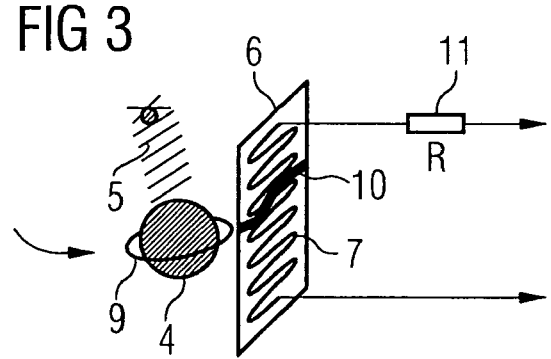
FIG. 3 shows a schematic sequence of movements and effect of the inventive acceleration sensor.

The movable mass 4 does not have to be deflected in the direction of the spring; it can just as well swing sideways on a sprung support or a line support. This is indicated in FIG. 3 by a curved arrow next to the mass 4. The mass 4 which is shown here hanging on the spring 5 is deflected sideways as a result of its acceleration. In its backwards movement it then hits a perpendicular sensor wall 6 which lies in parallel to the plane in which the support of the mass 4 is located in its idle position. The electrical conductor 7 is embedded in the sensor wall 6. If the impact of the mass 4 on the sensor wall 6 is great enough, the sensor wall 6 is destroyed by the mass 4. This is indicated by the break point 10 in the sensor wall 6. The electrical conductor 7 is interrupted by the destruction of the sensor wall 6. The interruption of the conductor 7 is interrogated electrically and, in accordance with the invention, is communicated to the outside world via an RFID transceiver device. In the simplest case this involves measuring a bias resistance which is connected in series with the electrical conductor 7. If the conductor 7 is intact, the series circuit comprising conductor 7 and resistance 10 has a value equivalent to the resistance 10. If on the other hand the conductor 7 is interrupted, an infinite resistance is measured.

To increase the destructive force of the mass 4 and thereby to improve the suspension of the mass 4, the moveable mass 4 in the embodiment depicted in FIG. 3 is also provided with a blade 9. This runs in the diagram shown in FIG. 3 around the entire mass 4 and has a sharp edge with which it touches the sensor wall 6 when it comes into contact with the latter. Reducing the effective surface of the mass 4 to the sharp edge 9 has the effect of creating a higher pressure when the mass 4 arrives at the wall 6 and thereby enabling the wall 6 to be destroyed more quickly.

Figure 4:
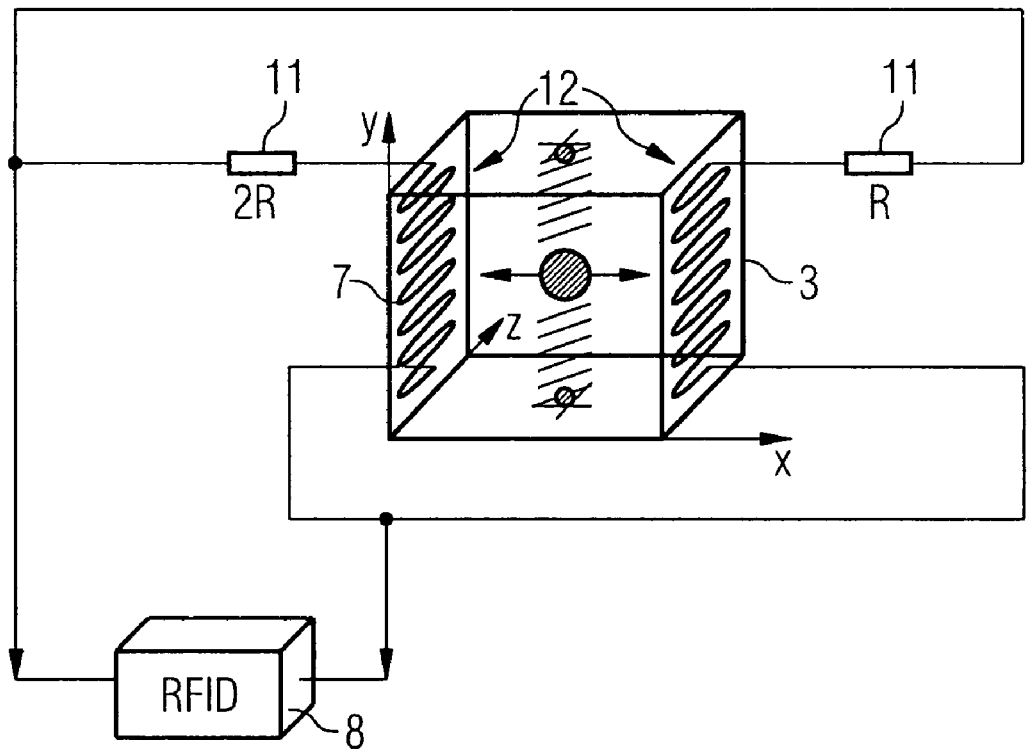
FIG. 4 shows a schematic further embodiment of the inventive acceleration sensor.

It can be important, for objects of which the sensitivity in respect of accelerations is dependent on direction, to establish, over and above the previous information, the direction from which the acceleration/the shock has occurred. To this end the inventors have developed the embodiment shown in FIG. 4. Basically this further development differs from the embodiments previously considered in that the sensor wall 6 features a number of direction segments which are arranged in different directions. For the embodiment in accordance with FIG. 4 two opposing direction elements of the sensor wall 6, each with an independent electrical conductor 7, are provided to illustrate the principle, as has been explained in relation to single walls 6 in the above exemplary embodiments in accordance with FIG. 1 to 3. Both conductors 7 are connected to their own bias resistance 11, so that a direction detector 12 for the left or the right side respectively is produced. Depending on the direction in which the mass 4 is deflected, the right or the left direction detector is destroyed. The two directions of deflection of the mass considered here are indicated by an arrow in FIG. 4. The two direction detectors 12 are connected in parallel electrically and linked as a parallel circuit to the RFID module 8. Thus if the two direction detectors are still intact since there have not been any overlarge acceleration, the RFID module 8 will transmit signals which are characteristic of an ohmic resistance, which corresponds to the parallel circuit of the two resistors 11. In the embodiment shown the "right" resistor has the value "R", the "left" resistor has the value "2R". A value of (⅔)R is thus produced as the overall resistance. If one of the two direction detectors 12 is destroyed, a resistance is measured which depends on which of the two direction detectors 12 is destroyed. Thus in the case of a destroyed "right" direction detector 12 the resistance "2R" is measured, in the case of a destroyed "left" direction detector 12 the resistance "R". In this way not only can it be established from outside using non-contact means whether a limit value has been exceeded, but its geometric direction can also be established.

Figure 5:
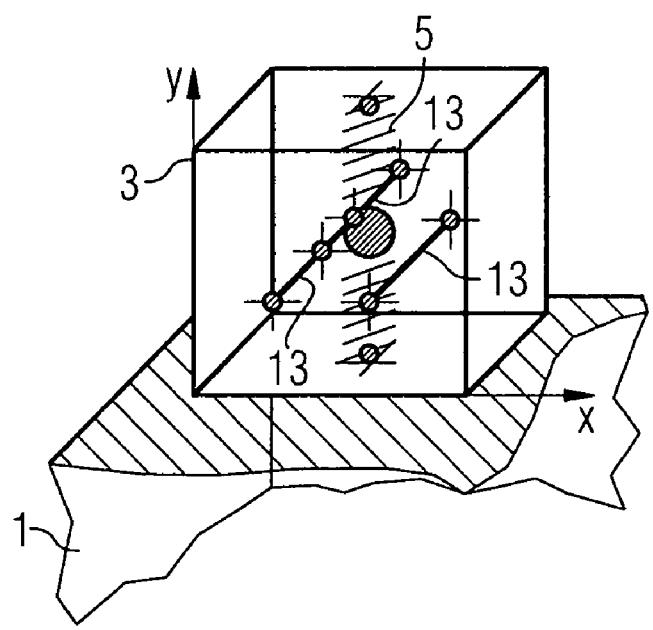
FIG. 5 shows a schematic diagram of the particular characteristic of a further embodiment of the inventive acceleration sensor.

Since as a rule the inventive sensor is not used immediately after it is manufactured, it is of advantage for it to be able to be activated and deactivated. To this end a transport lock is provided in the embodiment in accordance with FIG. 5 which consists of three transport lock devices 13. These transport lock devices 13 are bars in the simplest embodiment shown which are inserted into the support frame 3 so that they prevent the mass 4 from moving. In the embodiment shown in FIG. 5 it is assumed that the mass 4 can only move in the y direction, i.e. from top to bottom. In this case the three bars 13 shown are sufficient for retaining the mass 4. Naturally correspondingly more locking devices 13 are provided if the mass 4 can move in more than only one direction.

It is self-evident to the person skilled in the art that the form of the mass 4 plays a subordinate role here. In the graphical presentation of the preferred embodiment of the invention the mass 4 is shown exclusively as a ball. Obviously however the mass 4 can also be cuboid, trapezoid, or wedge-shaped or it can assume an entirely irregular shape.

Further embodiments have been essentially described in the above description which are based on the destruction of an embedded conductor 7. The invention can however also be implemented equally well with a sensor, in which the movable mass 4 is mechanically held over at least one electrical conductor 7 by the support frame 3. If the deflection of the movable mass 4 is then too great, i.e. the acceleration exceeds a predetermined threshold value, the at least one electrical conductor 7 fractures so that an electrical connection is interrupted. This is communicated to the outside world via an RFID module, so information is obtained which reflects the physical state of the sensor precisely as in the embodiments shown graphically.

The invention claimed is:

1. A sensor device for monitoring an acceleration of an object during a transportation, comprising:
    an acceleration sensor that is permanently connected to the object; and
    an RFID transceiver device connected to the acceleration sensor that non-contact couples electrical energy into the acceleration sensor and emits a radio signal based on a physical state of the acceleration sensor;
    wherein the acceleration sensor includes;
        a movable mass that deflects from a rest position as a function of the acceleration,
        a support frame that holds the movable mass, and
        an electrical conductor linked to the REID transceiver device that is irreversibly interrupted if the deflection of the movable mass exceeds a predetermined threshold value;
    and wherein the support frame comprises a sensor wall that is permanently connected to the electrical conductor and the movable mass is pressed against the sensor wall as a function of the acceleration to interrupt the electrical conductor if the pressure on the sensor wall exceeds a predetermined threshold value.

2. The sensor device as claimed in claim 1, wherein the movable mass is mechanically held over the electrical conductor and fractures the electrical conductor if the deflection of the movable mass exceeds the predetermined threshold value.

3. The sensor device as claimed in claim 1, wherein the sensor wall comprises a glass disk or a flexible membrane.

4. The sensor device as claimed in claim 1, wherein the movable mass comprises a narrow edge for pressing against the sensor wall.

5. The sensor device as claimed in claim 1, wherein the movable mass is movable in a plurality of directions and the support frame comprises a plurality of sensor walls arranged in the directions.

6. The sensor device as claimed in claim 1, wherein the movable mass is locked in a transport locking device before the acceleration sensor is activated.

7. The sensor device as claimed in claim 1, wherein a plurality of electrical conductors are each connected in series with one of a plurality of bias resistors to one of a plurality of direction detectors respectively.

8. The sensor device as claimed in claim 7, wherein the bias resistors comprise different values and the direction detectors are switched in parallel for recording directions of the acceleration.

9. A method for monitoring an acceleration of an object during a transportation, comprising:
    permanently connecting an acceleration sensor to the object;

connecting an RFID transceiver device to the acceleration sensor;

non-contact coupling electrical energy into the acceleration sensor by the RFID transceiver device;

emitting a radio signal based on a physical state of the acceleration sensor by the RFID transceiver device;

wherein the acceleration sensor comprises;

a movable mass that deflects from a rest position as a function of the acceleration, a support frame that holds the movable mass, and an electrical conductor linked to the RFID transceiver device that is irreversibly interrupted if the deflection of the movable mass exceeds a predetermined threshold value;

and wherein the support frame comprises a sensor wall that is permanently connected to the electrical conductor and the movable mass is pressed against the sensor wall as a function of the acceleration to interrupt the electrical conductor if the pressure on the sensor wall exceeds a predetermined threshold value.

10. The method as claimed in claim 9, wherein the movable mass is mechanically held over the electrical conductor and fractures the electrical conductor if the deflection of the movable mass exceeds the predetermined threshold value.

11. The method as claimed in claim 9, wherein the sensor wall comprises a glass disk or a flexible membrane.

12. The method as claimed in claim 9, wherein the movable mass comprises a narrow edge for pressing against the sensor wall.

13. The method as claimed in claim 9, wherein the movable mass is movable in a plurality of directions and the support frame comprises a plurality of sensor walls arranged in the directions.

14. The method as claimed in claim 9, wherein the movable mass is locked in a transport locking device before the acceleration sensor is activated.

15. The method as claimed in claim 9, wherein a plurality of electrical conductors are each connected in series with one of a plurality of bias resistors to one of a plurality of direction detectors respectively.

16. The method as claimed in claim 15, wherein the bias resistors comprise different values and the direction detectors are switched in parallel for recording directions of the acceleration.

\* \* \* \* \*